US012809360B2

(12) United States Patent
Huang et al.

(10) Patent No.: US 12,809,360 B2
(45) Date of Patent: Nov. 24, 2026

(54) SYSTEMS AND METHODS FOR SUSTAINABILITY RECOMMENDATIONS AS A SERVICE

(71) Applicant: Rockwell Automation Technologies, Inc., Mayfield Heights, OH (US)

(72) Inventors: Yuhong Huang, Acton, MA (US); Alexandra L. Schwertner, Cleveland, OH (US); Andrea Ruotolo, Tiny (CA); Kyle Crum, Bayside, WI (US); Frank Schirra, Lucerne (CH)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 468 days.

(21) Appl. No.: 18/476,525

(22) Filed: Sep. 28, 2023

(65) Prior Publication Data

US 2025/0110488 A1 Apr. 3, 2025

(51) Int. Cl.
*G05B 19/418* (2006.01)

(52) U.S. Cl.
CPC ... *G05B 19/41885* (2013.01); *G05B 19/4183* (2013.01)

(58) Field of Classification Search
CPC ...................... G05B 19/41885; G05B 19/4183
See application file for complete search history.

(56) References Cited

U.S. PATENT DOCUMENTS 7,479,751 B2 1/2009 Sladek et al.
8,321,187 B2 11/2012 Kaufman et al.
8,648,708 B2 2/2014 Lombardi et al.
8,670,962 B2 3/2014 Kaufman et al.
8,738,190 B2 5/2014 Pai et al.
8,831,927 B2 9/2014 March
8,892,540 B2 11/2014 Walker et al.
9,129,231 B2 9/2015 Kaufman et al.
9,274,518 B2 3/2016 Pai et al.
9,304,963 B2 4/2016 Xiao et al.
9,354,651 B2 5/2016 Schmidt et al.
9,395,704 B2 7/2016 Pai et al.
9,406,036 B2 8/2016 Kaufman et al.
9,423,848 B2 8/2016 Keller et al.
9,501,804 B2 11/2016 Kaufman
9,684,288 B2 6/2017 Schmidt et al.
9,785,126 B2 10/2017 Kaufman
9,798,343 B2 10/2017 Kaufman
(Continued)

*Primary Examiner* — Yuhui R Pan
(74) *Attorney, Agent, or Firm* — Fletcher Yoder, P.C.

(57) ABSTRACT

A system includes processing circuitry and a memory. The memory stores instructions that, when executed by the processing circuitry, cause the processing circuitry to receiving operational data captured from an industrial automation system performing an industrial automation process, model the industrial automation process based on the operational data, model one or more adjustments to the industrial automation process, identify that the modeling of the one or more adjustments to the industrial automation process indicates that the one or more adjustments to the industrial automation process improve one or more sustainability metrics for the industrial automation process, generate one or more sustainability recommendations to implement the one or more adjustments to the industrial automation process, and implement the one or more adjustments to the industrial automation process.

20 Claims, 9 Drawing Sheets

(56) References Cited

U.S. PATENT DOCUMENTS

| | | | | |
|---|---|---|---|---|
| 9,842,372 | B2 | 12/2017 | Kaufman | |
| 9,911,163 | B2 | 3/2018 | Kaufman | |
| 10,013,666 | B2 | 7/2018 | Walker et al. | |
| 10,223,167 | B2 | 3/2019 | Kaufman et al. | |
| 10,726,026 | B2 | 7/2020 | Walker et al. | |
| 2015/0276208 | A1* | 10/2015 | Maturana | G05B 13/04 700/274 |
| 2017/0176984 | A1* | 6/2017 | Schmidt | G05B 19/41885 |
| 2024/0193684 | A1* | 6/2024 | Bai | G06Q 20/123 |

* cited by examiner

900

| PURCHASED ELECTRICITY | |
|---|---|
| GRID REGION - LOCATION BASED | CO2 FACTOR (kg/kWh) |
| U.S. | 0.429634528 |
| CA | 0.13 |
| SOUTH AUSTRALIA | 0.44 |
| SWIS IN WESTERN AUTRALIA | 0.69 |
| NORTHERN TERRITORY | 0.63 |
| NORTH CHINA GRID | 0.968 |
| EAST CHINA GRID | 0.8046 |
| CENTRAL CHINA GRID | 0.9014 |
| CHINA NORTHWEST GRID | 0.9155 |
| CHINA SOUTHERN GRID | 0.8367 |

902 904

*FIG. 10*

SYSTEMS AND METHODS FOR SUSTAINABILITY RECOMMENDATIONS AS A SERVICE

BACKGROUND

The present disclosure generally relates developing improving how an industrial automation system performs in one or more tracked sustainability metrics.

Industrial automation systems may be used to provide automated control of one or more actuators in an industrial setting. As sustainability becomes a higher priority for stakeholders and customers of enterprises operating industrial automation systems, these enterprises are looking for ways to improve their performance in tracked sustainability metrics. However, enterprises operating industrial automation systems may find it difficult to stay up to date on sustainability best practices because they change quickly. Accordingly, techniques for improving sustainability of industrial automation systems are desired.

This section is intended to introduce the reader to aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In an embodiment, a system includes processing circuitry and a memory. The memory stores instructions that, when executed by the processing circuitry, cause the processing circuitry to receiving operational data captured from an industrial automation system performing an industrial automation process, model the industrial automation process based on the operational data, model one or more adjustments to the industrial automation process, identify that the modeling of the one or more adjustments to the industrial automation process indicates that the one or more adjustments to the industrial automation process improve one or more sustainability metrics for the industrial automation process, generate one or more sustainability recommendations to implement the one or more adjustments to the industrial automation process, and implement the one or more adjustments to the industrial automation process.

In another embodiment, a method includes receiving first operational data representative of a plurality of respective industrial automation processes performed by a plurality of industrial automation systems, training a model to simulate the plurality of respective industrial automation process based on the first operational data, receiving second operational data captured from a particular industrial automation system performing a particular industrial automation process at a particular facility, applying the trained model to simulate the particular industrial automation process based on the second operational data, identifying that simulating one or more adjustments to the particular industrial automation process indicates that the one or more adjustments to the particular industrial automation process improve one or more sustainability metrics for the particular industrial automation process, generating one or more sustainability recommendations to implement the one or more adjustments to the particular industrial automation process, and transmitting the one or more sustainability recommendations to the particular facility.

In a further embodiment, non-transitory computer readable medium stores instructions that, when executed by processing circuitry, cause the processing circuitry to collect operational data from an industrial automation system performing an industrial automation process, transmit the operational data to a service provider, receive, from the service provider, one or more sustainability recommendations to implement one or more adjustments to the industrial automation process, wherein modeling of the one or more adjustments to the industrial automation process indicates that the one or more adjustments to the industrial automation process improve one or more sustainability metrics for the industrial automation process, and implement the one or more adjustments to the industrial automation process.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

These and other features, aspects, and advantages of the present embodiments will become better understood when the following detailed description is read with reference to the accompanying drawings in which like characters represent like parts throughout the drawings, wherein:

FIG. 10 illustrates a chart with various geographical regions and associated emissions data (e.g., CO2 factor) for operating the industrial automation systems shown in FIGS. 1, 3, and 4 in the various geographical regions, in accordance with embodiments presented herein.

DETAILED DESCRIPTION

Figure 1:
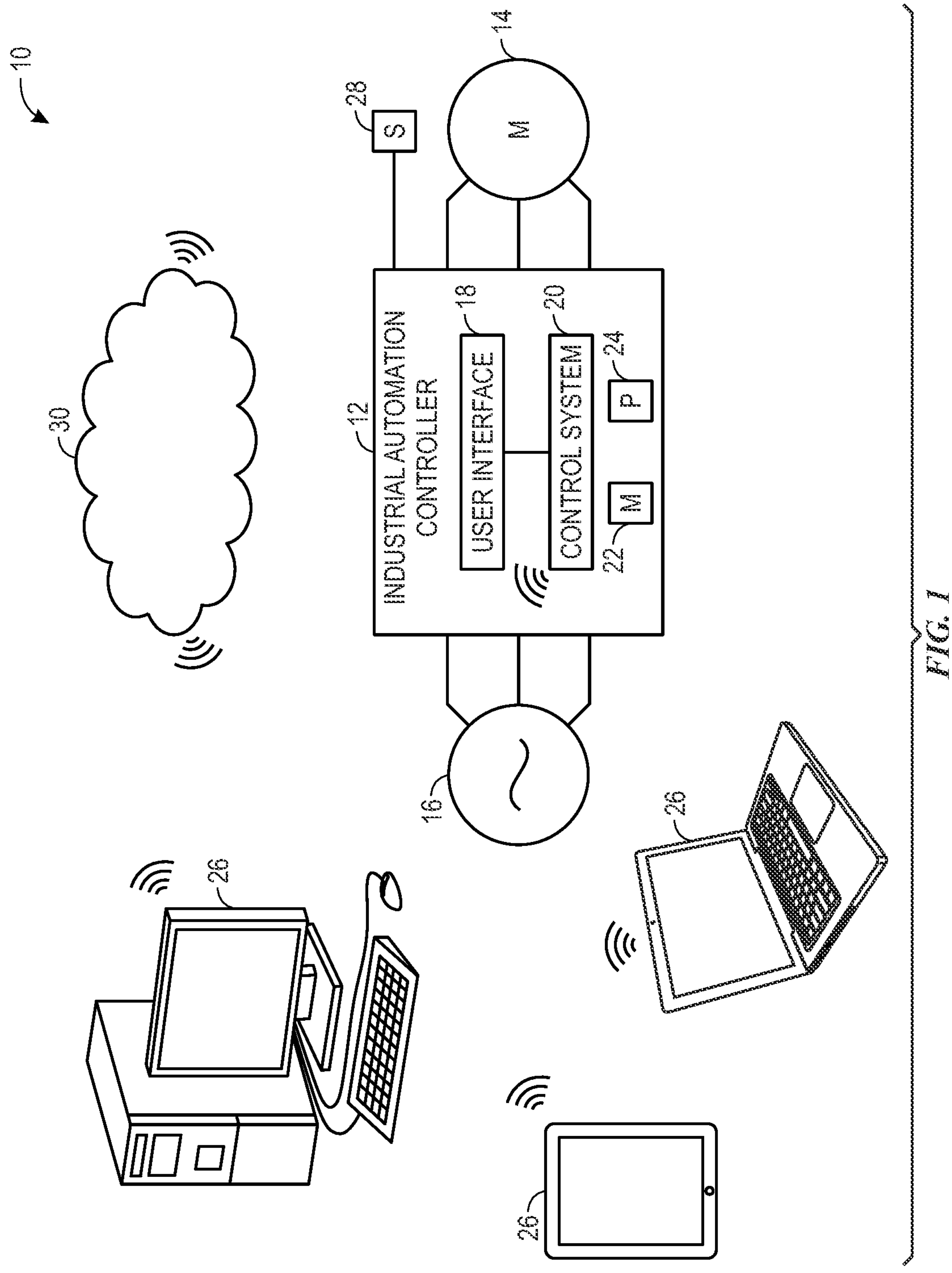
FIG. 1 is a schematic view of an industrial automation system, in accordance with embodiments presented herein.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

The present disclosure is directed to techniques for developing recommendations for improving performance in one or more tracked sustainability metrics in operating one or more industrial automation systems. Specifically, a service provider may receive operational data from one or more enterprises operating one or more industrial automation systems to perform one or more industrial automation processes. The service provider may generate a training data set based on the received data and train a model to model or simulate the industrial automation processes. The model may be configured to receive operational data captured from an industrial automation system performing an industrial automation process, model the industrial automation process, model one or more adjustments to the industrial automation process, and identify adjustments that improve one or more sustainability metrics. In some embodiments, trained models may be provided to enterprise customers to run locally. In other embodiments, the models may be run by the service provider and the enterprise customers may provide data to the service provider, which applies a model to the data and returns sustainability recommendations. In some cases, the sustainability recommendations may quantify the expected improvement in the one or more sustainability metrics by implementing the sustainability recommendation. For example, one or more visualizations may be provided to an operator. The sustainability metrics may include, for example, energy consumption, emissions, water consumption, raw material consumption, chemical usage, waste produced, carbon footprint, and so forth. Sustainability recommendations may include adjusting one or more operational parameters, adjusting one or more threshold values, adjusting a production schedule, scheduling of maintenance, scheduling a service, and so forth. Some sustainability recommendations may be automatically implemented, while others may be implemented after authorization. Still other sustainability recommendations (e.g., rearranging equipment, replacing equipment, using different raw materials, performing a new process, etc.) may be implemented manually by a human. As time progresses, the service provider may further train models using data received from enterprise customers or other available data. Additional details with regard to sustainability recommendations as a service in accordance with the techniques described above will be provided below with reference to FIGS. 1-10.

By way of introduction, FIG. 1 is a schematic view of an example industrial automation system 10 in which the embodiments described herein may be implemented. As shown, the industrial automation system 10 includes a controller 12 and an actuator 14 (e.g., a motor). The industrial automation system 10 may also include, or be coupled to, a power source 16. The power source 16 may include a generator, an external power grid, a battery, or some other source of power. The controller 12 may be a stand-alone control unit that controls multiple industrial automation components (e.g., a plurality of motors 14), a controller 12 that controls the operation of a single automation component (e.g., motor 14), or a subcomponent within a larger industrial automation system 10. In the instant embodiment, the controller 12 includes a user interface 18, such as a human machine interface (HMI), and a control system 20, which may include a memory 22 and a processor 24. The controller 12 may include a cabinet or some other enclosure for housing various components of the industrial automation system 10, such as a motor starter, a disconnect switch, etc.

The control system 20 may be programmed (e.g., via computer readable code or instructions stored on the memory 22, such as a non-transitory computer readable medium, and executable by the processor 24) to provide signals for controlling the motor 14. In certain embodiments, the control system 20 may be programmed according to a specific configuration desired for a particular application. For example, the control system 20 may be programmed to respond to external inputs, such as reference signals, alarms, command/status signals, etc. The external inputs may originate from one or more relays or other electronic devices. The programming of the control system 20 may be accomplished through software or firmware code that may be loaded onto the internal memory 22 of the control system 20 (e.g., via a locally or remotely located computing device 26) or programmed via the user interface 18 of the controller 12. The control system 20 may respond to a set of operating parameters. The settings of the various operating parameters may determine the operating characteristics of the controller 12. For example, various operating parameters may determine the speed or torque of the motor 14 or may determine how the controller 12 responds to the various external inputs. As such, the operating parameters may be used to map control variables within the controller 12 or to control other devices communicatively coupled to the controller 12. These variables may include, for example, speed presets, feedback types and values, computational gains and variables, algorithm adjustments, status and feedback variables, programmable logic controller (PLC) control programming, and the like.

In some embodiments, the controller 12 may be communicatively coupled to one or more sensors 28 for detecting operating temperatures, voltages, currents, pressures, flow rates, and other measurable variables associated with the industrial automation system 10. With feedback data from the sensors 28, the control system 20 may keep detailed track of the various conditions under which the industrial automation system 10 may be operating. For example, the feedback data may include conditions such as actual motor speed, voltage, frequency, power quality, alarm conditions, etc. In some embodiments, the feedback data may be communicated back to the computing device 26 for additional analysis.

The computing device 26 may be communicatively coupled to the controller 12 via a wired or wireless connection. The computing device 26 may receive inputs from a user defining an industrial automation project using a native application running on the computing device 26 or using a website accessible via a browser application, a software application, or the like. The user may define the industrial automation project by writing code, interacting with a visual programming interface, inputting or selecting values via a graphical user interface, or providing some other inputs. The user may use licensed software and/or subscription services to create, analyze, and otherwise develop the project. The computing device 26 may send a project to the controller 12 for execution. Execution of the industrial automation project causes the controller 12 to control components (e.g., motor 14) within the industrial automation system 10 through performance of one or more tasks and/or processes. In some applications, the controller 12 may be communicatively positioned in a private network and/or behind a firewall, such that the controller 12 does not have communication access outside a local network and is not in communication with any devices outside the firewall, other than the computing device 26. The controller 12 may collect feedback data during execution of the project, and the feedback data may be provided back to the computing device 26 for analysis. Feedback data may include, for example, one or more execution times, one or more alerts, one or more error messages, one or more alarm conditions, one or more temperatures, one or more pressures, one or more flow rates, one or more motor speeds, one or more voltages, one or more frequencies, and so forth. The project may be updated via the computing device 26 based on the analysis of the feedback data.

The computing device 26 may be communicatively coupled to a cloud server 30 or remote server via the internet, or some other network. In one embodiment, the cloud server 30 may be operated by the manufacturer of the controller 12, a software provider, a seller of the controller 12, a service provider, operator of the controller 12, owner of the controller 12, etc. The cloud server 30 may be used to help customers create and/or modify projects, to help troubleshoot any problems that may arise with the controller 12, or to provide other services (e.g., project analysis, enabling, restricting capabilities of the controller 12, data analysis, controller firmware updates, etc.). The remote/cloud server 30 may be one or more servers operated by the manufacturer, software provider, seller, service provider, operator, or owner of the controller 12. The remote/cloud server 30 may be disposed at a facility owned and/or operated by the manufacturer, software provider, seller, service provider, operator, or owner of the controller 12. In other embodiments, the remote/cloud server 30 may be disposed in a datacenter in which the manufacturer, software provider, seller, service provider, operator, or owner of the controller 12 owns or rents server space. In further embodiments, the remote/cloud server 30 may include multiple servers operating in one or more data center to provide a cloud computing environment.

Figure 2:
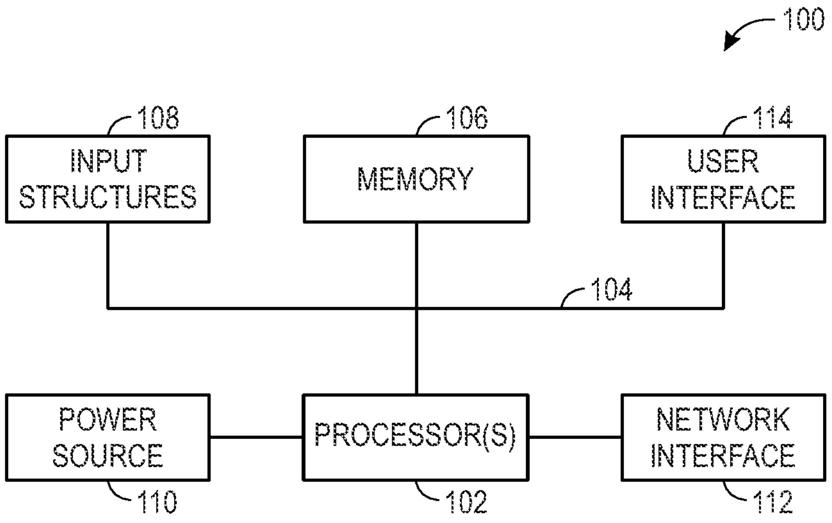
FIG. 2 is a block diagram of example components that could be used in the industrial automation system of FIG. 1, in accordance with embodiments presented herein.

FIG. 2 illustrates a block diagram of example components of a computing device 100 that could be used as the computing device 26, the cloud/remote server 30, the controller 12, or some other device within the system 10 shown in FIG. 1. As used herein, a computing device 100 may be implemented as one or more computing systems including laptop, notebook, desktop, tablet, HMI, or workstation computers, as well as server type devices or portable, communication type devices, such as cellular telephones and/or other suitable computing devices.

As illustrated, the computing device 100 may include various hardware components, such as one or more processors 102, one or more busses 104, memory 106, input structures 108, a power source 110, a network interface 112, a user interface 114, and/or other computer components useful in performing the functions described herein.

The one or more processors 102 may include, in certain implementations, microprocessors configured to execute instructions stored in the memory 106 or other accessible locations. Alternatively, the one or more processors 102 may be implemented as application-specific integrated circuits (ASICs), field-programmable gate arrays (FPGAs), and/or other devices designed to perform functions discussed herein in a dedicated manner. As will be appreciated, multiple processors 102 or processing components may be used to perform functions discussed herein in a distributed or parallel manner.

The memory 106 may encompass any tangible, non-transitory medium for storing data or executable routines. Although shown for convenience as a single block in FIG. 2, the memory 106 may encompass various discrete media in the same or different physical locations. The one or more processors 102 may access data in the memory 106 via one or more busses 104.

The input structures 108 may allow a user to input data and/or commands to the device 100 and may include mice, touchpads, touchscreens, keyboards, controllers, and so forth. The power source 110 can be any suitable source for providing power to the various components of the computing device 100, including line and battery power. In the depicted example, the device 100 includes a network interface 112. Such a network interface 112 may allow communication with other devices on a network using one or more communication protocols. In the depicted example, the device 100 includes a user interface 114, such as a display that may display images or data provided by the one or more processors 102. The user interface 114 may include, for example, a monitor, a display, and so forth. As will be appreciated, in a real-world context a processor-based system, such as the computing device 100 of FIG. 2, may be employed to implement some or all of the present approach, such as performing the functions of the controller, the computing device 26, and/or the cloud/remote server 30 shown in FIG. 1, as well as other memory-containing devices.

Figure 3:
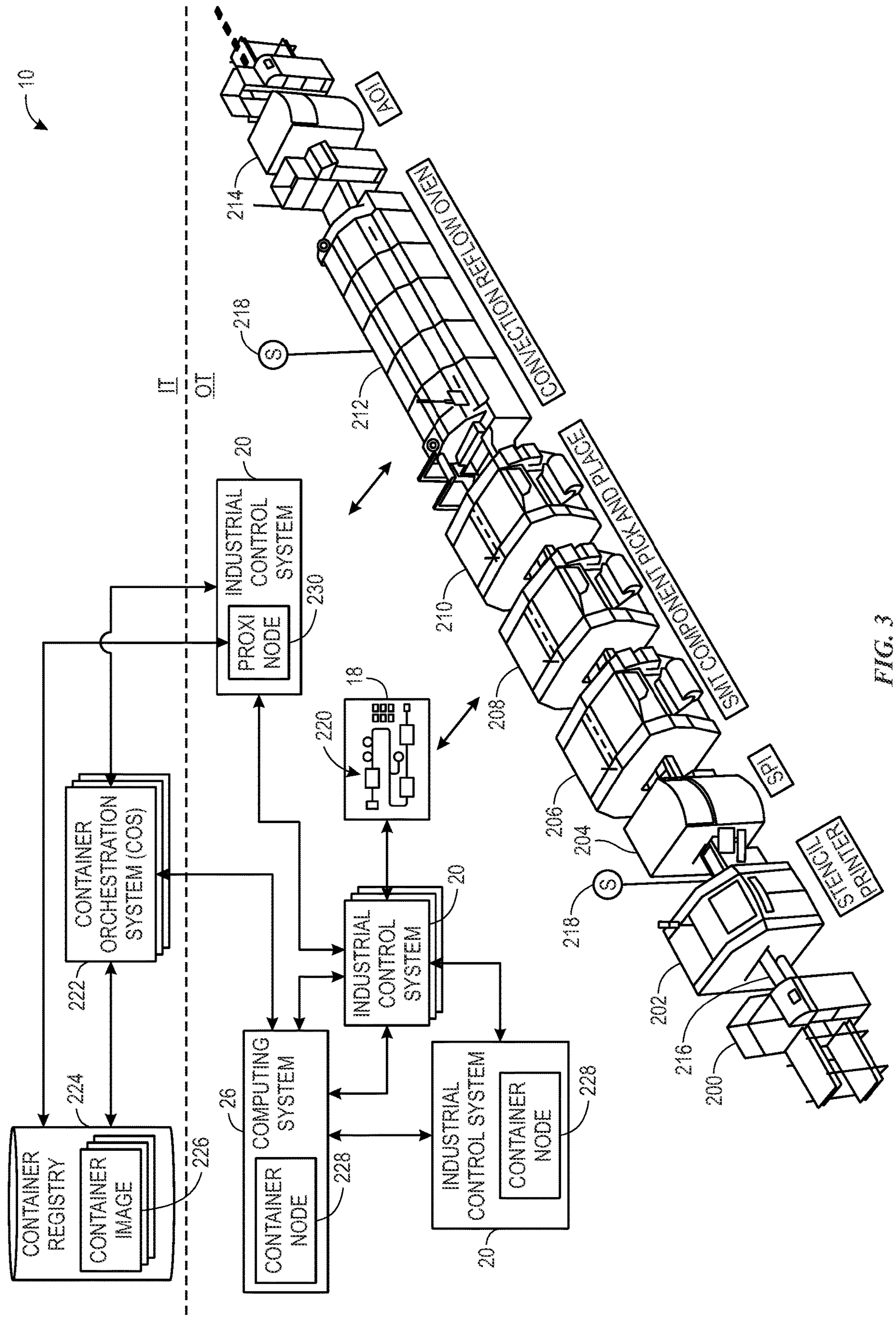
FIG. 3 is a perspective view of an example of the industrial automation system of FIG. 1 controlled by an industrial control system, in accordance with an embodiment.

FIG. 3 is a perspective view of an example of the industrial automation system 10 of FIG. 1. The industrial automation system 10 includes stations 200, 202, 204, 206, 208, 210, 212, 214 having machine components and/or machines to conduct functions within an automated process, such as silicon wafer manufacturing, as is depicted. The automated process may begin at a station 200 used for loading objects, such as substrates, into the industrial automation system 10 via a conveyor section 216. For example, objects may be transported along the conveyor section 216 to station 202 to perform a first action, such a printing solder paste to the substrate via stenciling. As objects exit from the station 202, the objects may be transported via the conveyor section 216 to a station 204 for solder paste inspection (SPI) to inspect printer results, to a station 206, 208, and 210 for surface mount technology (SMT) component placement, to a station 212 for convection reflow oven to melt the solder to make electrical couplings, and finally to a station 214 for automated optical inspection (AOI) to inspect the object manufactured (e.g., the manufactured printed circuit board). After the objects proceed through the various stations, the objects may be removed from the station 214, for example, for storage in a warehouse or for shipment. It should be understood, however, that, for other applications, the particular system, machine components, machines, stations, and/or conveyors may be different or specially adapted to the application.

For example, the industrial automation system 10 may include machinery to perform various operations in a compressor station, an oil refinery, a batch operation for making food items, chemical processing operations, brewery operations, mining operations, a mechanized assembly line, and so forth. Accordingly, the industrial automation system 10 may include a variety of operational components, such as electric motors, valves, actuators, temperature elements, pressure sensors, conveyors, movers, or a myriad of machinery or devices used for manufacturing, processing, material handling, packaging, transport, storage, distribution, and other applications. The industrial automation system 10 may also include electrical equipment, hydraulic equipment, compressed air equipment, steam equipment, mechanical tools, protective equipment, refrigeration equipment, power lines, hydraulic lines, steam lines, and the like. Some example types of equipment may include mixers, machine conveyors, tanks, skids, specialized original equipment manufacturer machines, and the like. In addition to the equipment described above, the industrial automation system 10 may also include motors, protection devices, switchgear, compressors, and the like. Each of these described operational components may correspond to and/or generate a variety of operational technology (OT) data regarding operation, status, sensor data, operational modes, alarm conditions, or the like, that may be desirable to output for analysis with IT data from an IT network, for storage in an IT network, for analysis with expected operation set points (e.g., thresholds), or the like.

In certain embodiments, one or more properties of the industrial automation system 10 equipment, such as the stations 200, 202, 204, 206, 208, 210, 212, 214, may be monitored and controlled by the industrial control systems 20 for regulating control variables. For example, sensing devices (e.g., sensors 218) may monitor various properties of the industrial automation system 10 and may be used by the industrial control systems 20 at least in part in adjusting operations of the industrial automation system 10 (e.g., as part of a control loop). In some cases, the industrial automation system 10 may be associated with devices used by other equipment. For instance, scanners, gauges, valves, flow meters, and the like may be disposed on or within the industrial automation system 10. Here, the industrial control systems 20 may receive data from the associated devices and use the data to perform their respective operations more efficiently. For example, a controller of the industrial automation system 10 associated with a motor drive may receive data regarding a temperature of a connected motor and may adjust operations of the motor drive based on the data.

The industrial control systems 20 may include or be communicatively coupled to the display/operator interface 18 (e.g., a human-machine interface (HMI)) and to devices of the industrial automation system 10. It should be understood that any suitable number of industrial control systems 20 may be used in a particular industrial automation system 10 embodiment. The industrial control systems 20 may facilitate representing components of the industrial automation system 10 through programming objects that may be instantiated and executed to provide simulated functionality similar or identical to the actual components, as well as visualization of the components, or both, on the display/operator interface 18. The programming objects may include code and/or instructions stored in the industrial control systems 20 and executed by processing circuitry of the industrial control systems 20. The processing circuitry may communicate with memory circuitry to permit the storage of the component visualizations.

As illustrated, a display/operator interface 18 may be configured to depict representations 220 of the components of the industrial automation system 10. The industrial control system 20 may use data transmitted by the sensors 218 to update visualizations of the components via changing one or more statuses, states, and/or indications of current operations of the components. These sensors 218 may be any suitable device adapted to provide information regarding process conditions. Indeed, the sensors 218 may be used in a process loop (e.g., control loop) that may be monitored and controlled by the industrial control system 20. As such, a process loop may be activated based on process inputs (e.g., an input from the sensor 218) or direct input from a person via the display/operator interface 18. The person operating and/or monitoring the industrial automation system 10 may reference the display/operator interface 18 to determine various statuses, states, and/or current operations of the industrial automation system 10 and/or for a particular component. Furthermore, the person operating and/or monitoring the industrial automation system 10 may adjust to various components to start, stop, power-down, power-on, or otherwise adjust an operation of one or more components of the industrial automation system 10 through interactions with control panels or various input devices.

The industrial automation system 10 may be considered a data-rich environment with several processes and operations that each respectively generate a variety of data. For example, the industrial automation system 10 may be associated with material data (e.g., data corresponding to substrate or raw material properties or characteristics), parametric data (e.g., data corresponding to machine and/or station performance, such as during operation of the industrial automation system 10), test results data (e.g., data corresponding to various quality control tests performed on a final or intermediate product of the industrial automation system 10), or the like, that may be organized and sorted as OT data. In addition, sensors 218 may gather OT data indicative of one or more operations of the industrial automation system 10 or the industrial control system 20. In this way, the OT data may be analog data or digital data indicative of measurements, statuses, alarms, or the like associated with operation of the industrial automation system 10 or the industrial control system 20.

The industrial control systems 12 described above may operate in an OT space in which OT data is used to monitor and control OT assets, such as the equipment illustrated in the stations 200, 202, 204, 206, 208, 210, 212, 214 of the industrial automation system 10 or other industrial equipment. The OT space, environment, or network generally includes direct monitoring and control operations that are coordinated by the industrial control system 20 and a corresponding OT asset. For example, a programmable logic controller (PLC) may operate in the OT network to control operations of an OT asset (e.g., drive, motor, and/or high-level controllers). The industrial control systems 20 may be specifically programmed or configured to communicate directly with the respective OT assets.

A container orchestration system 222, on the other hand, may operate in an information technology (IT) environment. That is, the container orchestration system 222 may include a cluster of multiple computing devices that coordinates an automatic process of managing or scheduling work of individual containers for applications within the computing devices of the cluster. In other words, the container orchestration system 222 may be used to automate various tasks at scale across multiple computing devices. By way of example, the container orchestration system 222 may automate tasks such as configuring and scheduling deployment of containers, provisioning and deploying containers, determining availability of containers, configuring applications in terms of the containers that they run in, scaling of containers to equally balance application workloads across an infrastructure, allocating resources between containers, performing load balancing, traffic routing, and service discovery of containers, performing health monitoring of containers, securing the interactions between containers, and the like. In any case, the container orchestration system 222 may use configuration files to determine a network protocol to facilitate communication between containers, a storage location to save logs, and the like. The container orchestration system 222 may also schedule deployment of containers into clusters and identify a host (e.g., node) that may be best suited for executing the container. After the host is identified, the container orchestration system 222 may manage the lifecycle of the container based on predetermined specifications.

With the foregoing in mind, it should be noted that containers refer to technology for packaging an application along with its runtime dependencies. That is, containers include applications that are decoupled from an underlying host infrastructure (e.g., operating system). By including the run time dependencies with the container, the container may perform in the same manner regardless of the host in which it is operating. In some embodiments, containers may be stored in a container registry 224 as container images 226. The container registry 224 may be any suitable data storage or database that may be accessible to the container orchestration system 222. The container image 226 may correspond to an executable software package that includes the tools and data employed to execute a respective application. That is, the container image 226 may include related code for operating the application, application libraries, system libraries, runtime tools, default values for various settings, and the like.

By way of example, an integrated development environment (IDE) tool may be employed by a user to create a deployment configuration file that specifies a desired state for the collection of nodes of the container orchestration system 222. The deployment configuration file may be stored in the container registry 224 along with the respective container images 226 associated with the deployment configuration file. The deployment configuration file may include a list of different pods and a number of replicas for each pod that should be operating within the container orchestration system 222 at any given time. Each pod may correspond to a logical unit of an application, which may be associated with one or more containers. The container orchestration system 222 may coordinate the distribution and execution of the pods listed in the deployment configuration file, such that the desired state is continuously met. In some embodiments, the container orchestration system 222 may include a master node that retrieves the deployment configuration files from the container registry 224, schedules the deployment of pods to the connected nodes, and ensures that the desired state specified in the deployment configuration file is met. For instance, if a pod stops operating on one node, the master node may receive a notification from the respective worker node that is no longer executing the pod and deploy the pod to another worker node to ensure that the desired state is present across the cluster of nodes.

As mentioned above, the container orchestration system 222 may include a cluster of computing devices, computing systems, or container nodes that may work together to achieve certain specifications or states, as designated in the respective container. In some embodiments, container nodes 228 may be integrated within industrial control systems 20 as shown in FIG. 3. That is, container nodes 228 may be implemented by the industrial control systems 20, such that they appear as worker nodes to the master node in the container orchestration system 222. In this way, the master node of the container orchestration system 222 may send commands to the container nodes 228 that are also configured to perform applications and operations for the respective industrial equipment.

With this in mind, the container nodes 228 may be integrated with the industrial control systems 20, such that they serve as passive-indirect participants, passive-direct participants, or active participants of the container orchestration system 222. As passive-indirect participants, the container nodes 228 may respond to a subset of all of the commands that may be issued by the container orchestration system 222. In this way, the container nodes 228 may support limited container lifecycle features, such as receiving pods, executing the pods, updating a respective filesystem to included software packages for execution by the industrial control system 20, and reporting the status of the pods to the master node of the container orchestration system 222. The limited features implementable by the container nodes 228 that operate in the passive-indirect mode may be limited to commands that the respective industrial control system 20 may implement using native commands that map directly to the commands received by the master node of the container orchestration system 222. Moreover, the container node 228 operating in the passive-indirect mode of operation may not be capable to push the packages or directly control the operation of the industrial control system 20 to execute the package. Instead, the industrial control system 20 may periodically check the file system of the container node 228 and retrieve the new package at that time for execution.

As passive-direct participants, the container nodes 228 may operate as a node that is part of the cluster of nodes for the container orchestration system 222. As such, the container node 228 may support the full container lifecycle features. That is, container node 228 operating in the passive-direct mode may unpack a container image and push the resultant package to the industrial control system 20, such that the industrial control system 20 executes the package in response to receiving it from the container node 228. As such, the container orchestration system 222 may have access to a worker node that may directly implement commands received from the master node onto the industrial control system 20.

In the active participant mode, the container node 228 may include a computing module or system that hosts an operating system (e.g., Linux) that may continuously operate a container host daemon that may participate in the management of container operations. As such, the active participant container node 228 may perform any operations that the master node of the container orchestration system 222 may perform. By including a container node 228 operating in the OT space, the container orchestration system 222 is capable of extending its management operations into the OT space. That is, the container node 228 may provision devices in the OT space, serve as a proxy node 230 to provide bi-directional coordination between the IT space and the OT space, and the like. For instance, the container node 228 operating as the proxy node 230 may intercept orchestration commands and cause industrial control system 20 to implement appropriate machine control routines based on the commands. The industrial control system 20 may confirm the machine state to the proxy node 230, which may then reply to the master node of the container orchestration system 222 on behalf of the industrial control system 20.

Additionally, the industrial control system 20 may share an OT device tree via the proxy node 230. As such, the proxy node 230 may provide the master node with state data, address data, descriptive metadata, versioning data, certificate data, key information, and other relevant parameters concerning the industrial control system 20. Moreover, the proxy node 230 may issue requests targeted to other industrial control systems 20 to control other OT devices. For instance, the proxy node 230 may translate and forward commands to a target OT device using one or more OT communication protocols, may translate and receive replies from the OT devices, and the like. As such, the proxy node 230 may perform health checks, provide configuration updates, send firmware patches, execute key refreshes, and other OT operations for other OT devices.

Figure 4:
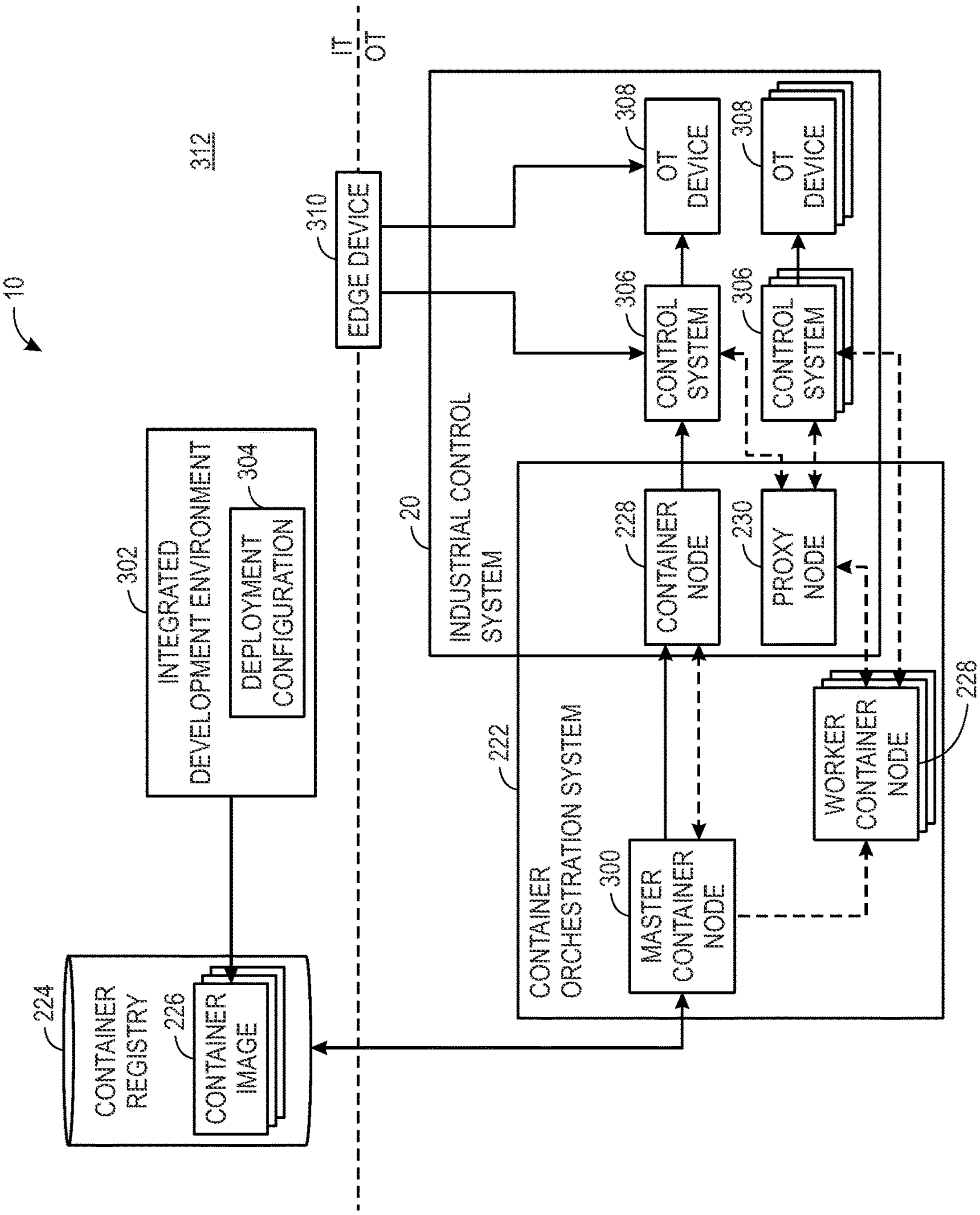
FIG. 4 is a block diagram of an example operational technology (OT) network, including the industrial control system of FIG. 3, that coordinates with a container orchestration system, in accordance with an embodiment.

FIG. 4 illustrates a block diagram that depicts the relative positions of the container node 228 and the proxy node 230 with respect to the container orchestration system 222. As mentioned above, the container orchestration system 222 may include a collection of nodes that are used to achieve a desired state of one or more containers across multiple nodes. As shown in FIG. 4, the container orchestration system 222 may include a master node 300 that may execute control plane processes for the container orchestration system 222. The control plane processes may include the processes that enable the container orchestration system 222 to coordinate operations of the container nodes 228 to meet the desired states. As such, the master container node 300 may execute an applications programming interface (API) for the container orchestration system 222, a scheduler component, core resource controllers, and the like. By way of example, the master container node 300 may coordinate all of the interactions between nodes of the cluster that make up the container orchestration system 222. Indeed, the master container node 300 may be responsible for deciding the operations that will run on container nodes 228 including scheduling workloads (e.g., containerized applications), managing the workloads' lifecycle, scaling, and upgrades, managing network and storage resources for the workloads, and the like. The master container node 300 may run an API server to handle requests and status updates received from the container nodes 228.

By way of operation, an integrated development environment (IDE) tool 302 may be used by an operator to develop a deployment configuration file 304. As mentioned above, the deployment configuration file 304 may include details regarding the containers, the pods, constraints for operating the containers/pods, and other information that describe a desired state of the containers specified in the deployment configuration file 304. In some embodiments, the deployment configuration file 304 may be generated in a YAML file, a JSON file, or other suitable file format that is compatible with the container orchestration system 222. After the IDE tool 302 generates the deployment configuration file 304, the IDE tool 302 may transmit the deployment configuration file 304 to the container registry 224, which may store the file along with container images 226 representative of the containers stored in the deployment configuration file 304.

In some embodiments, the master container node 300 may receive the deployment configuration file 304 via the container registry 224, directly from the IDE tool 302, or the like. The master container node 300 may use the deployment configuration file 304 to determine a location to gather the container images 226, determine communication protocols to use to establish networking between container nodes 228, determine locations for mounting storage volumes, locations to store logs for the containers, and the like.

Based on the desired state provided in the deployment configuration file 304, the master container node 300 may deploy containers to the container host nodes 228. That is, the master container node 300 may schedule the deployment of a container based on constraints (e.g., CPU or memory availability) provided in the deployment configuration file 304. After the containers are operating on the container nodes 228, the master container node 300 may manage the lifecycle of the containers to ensure that the containers specified by the deployment configuration file 304 are operating according to the specified constraints and the desired state.

Keeping the foregoing in mind, the industrial control system 20 may not use an operating system (OS) that is compatible with the container orchestration system 222. That is, the container orchestration system 222 may be configured to operate in the IT space that involves the flow of digital information. In contrast, the industrial control system 20 may operate in the OT space that involves managing the operation of physical processes and the machinery used to perform those processes. For example, the OT space may involve communications that are formatted according to OT communication protocols, such as FactoryTalk LiveData, EtherNet/IP. Common Industrial Protocol (CIP), OPC Direct Access (e.g., machine to machine communication protocol for industrial automation developed by the OPC Foundation), OPC Unified Architecture (OPCUA), or any suitable OT communication protocol (e.g. DNP3, Modbus, Profibus, Lon Works, DALI, BACnet, KNX, EnOcean). Because the industrial control systems 20 operate in the OT space, the industrial control systems may not be capable of implementing commands received via the container orchestration system 222.

In certain embodiments, the container node 228 may be programmed or implemented in the industrial control system 20 to serve as a node agent that can register the industrial control system 20 with the master container node 300. The node agent may or may not be the same as the proxy node 230 shown in FIG. 3. For example, the industrial control system 20 may include a PLC that cannot support an operating system (e.g., Linux) for receiving and/or implementing requested operations issued by the container orchestration system 222. However, the PLC may perform certain operations that may be mapped to certain container events. As such, the container node 228 may include software and/or hardware components that may map certain events or commands received from the master container node 300 into actions that may be performed by the PLC. After converting the received command into a command interpretable by the PLC, the container node 228 may forward the mapped command to the PLC that may implement the mapped command. As such, the container node 228 may operate as part of the cluster of nodes that make up the container orchestration system 222, while a first control system 306 (e.g., PLC) that coordinates the OT operations for a second OT device 308 in the industrial control system 12. The first control system 306 may include a controller, such as a PLC, an HLC, a programmable automation controller (PAC), or any other controller that may monitor, control, and operate an industrial automation device or component.

The OT device 308 may correspond to an industrial automation device or component. The OT device 308 may include any suitable industrial device that operates in the OT space. As such, the OT device 308 may be involved in adjusting physical processes being implemented via the industrial system 10. In some embodiments, the OT device 308 may include motor control centers, motors, HMIs, operator interfaces, contactors, starters, sensors, drives, relays, protection devices, switchgear, compressors, network switches (e.g., Ethernet switches, modular-managed, fixed-managed, service-router, industrial, unmanaged, etc.) and the like. In addition, the OT device 308 may also be related to various industrial equipment such as mixers, machine conveyors, tanks, skids, specialized original equipment manufacturer machines, and the like. The OT device 308 may also be associated with devices used by the equipment such as scanners, gauges, valves, flow meters, and the like.

In the present embodiments described herein, the control system 306 may thus perform actions based on commands received from the container node 228. By mapping certain container lifecycle states into appropriate corresponding actions implementable by the control system 306, the container node 228 enables program content for the industrial control system 20 to be containerized, published to certain registries, and deployed using the master container node 300, thereby bridging the gap between the IT-based container orchestration system 222 and the OT-based industrial control system 20.

In some embodiments, the container node 228 may operate in an active mode, such that the container node may invoke container orchestration commands for other container nodes 228. For example, a proxy node 230 may operate as a proxy or gateway node that is part of the container orchestration system 222. The proxy node 230 may be implemented in a sidecar computing module that has an operating system (OS) that supports the container host daemon. In another embodiment, the proxy node 230 may be implemented directly on a core of the control system 306 that is configured (e.g., partitioned), such that the control system 306 may operate using an operating system that allows the container node 228 to execute orchestration commands and serve as part of the container orchestration system 222. In either case, the proxy node 230 may serve as a bi-directional bridge for IT/OT orchestration that enables automation functions to be performed in IT devices based on OT data and in OT devices 308 based on IT data. For instance, the proxy node 230 may acquire OT device tree data, state data for an OT device, descriptive metadata associated with corresponding OT data, versioning data for OT devices 308, certificate/key data for the OT device, and other relevant OT data via OT communication protocols. The proxy node 230 may then translate the OT data into IT data that may be formatted to enable the master container node 300 to extract relevant data (e.g., machine state data) to perform analysis operations and to ensure that the container orchestration system 222 and the connected control systems 306 are operating at the desired state. Based on the results of its scheduling operations, the master container node 300 may issue supervisory control commands to targeted OT devices via the proxy nodes 230, which may translate and forward the translated commands to the respective control system 306 via the appropriate OT communication protocol.

In addition, the proxy node 230 may also perform certain supervisory operations based on its analysis of the machine state data of the respective control system 306. As a result of its analysis, the proxy node 230 may issue commands and/or pods to other nodes that are part of the container orchestration system 222. For example, the proxy node 230 may send instructions or pods to other worker container nodes 228 that may be part of the container orchestration system 222. The worker container nodes 228 may corresponds to other container nodes 228 that are communicatively coupled to other control systems 306 for controlling other OT devices 308. In this way, the proxy node 230 may translate or forward commands directly to other control systems 306 via certain OT communication protocols or indirectly via the other worker container nodes 228 associated with the other control systems 306. In addition, the proxy node 230 may receive replies from the control systems 306 via the OT communication protocol and translate the replies, such that the nodes in the container orchestration system 222 may interpret the replies. In this way, the container orchestration system 222 may effectively perform health checks, send configuration updates, provide firmware patches, execute key refreshes, and provide other services to OT devices 308 in a coordinated fashion. That is, the proxy node 230 may enable the container orchestration system to coordinate the activities of multiple control systems 306 to achieve a collection of desired machine states for the connected OT devices 308.

As shown in FIG. 4, the industrial automation system 10 may include one or more edge devices 310 that may interface between that IT and OT environments. Accordingly, the edge device 310 may be involved in data collection, data analysis, data transmission, and so forth. Further, the edge device may facilitate, manage, and/or control communication within and/or between the IT and OT environments. Further, in some embodiments, the edge device 310 may have compute capabilities (e.g., a compute surface) capable of running software, algorithms (e.g., machine learning algorithms, data analysis algorithms, data filtering/clean up/processing algorithms), containers, and so forth. As used herein, an "edge device" 310 is a device within the industrial automation system 10 that controls data flow within the industrial automation system 10 (e.g., the OT network) as well as between the industrial automation system 10 (e.g., the OT network) and an IT network 312. For example, the edge device 310 may be a router, a switch, or the like. In certain embodiments, the edge device 310 may receive commands from the OT environment and pass the commands to devices in the OT environment. The edge device 310 may receive commands from a device in the network 312 that may include, for example, an enterprise system, a server device, a plant management system, or the like. The enterprise system may include software and/or hardware components that support business processes, information flows, reporting, data analytics, and the like for an enterprise. The server device may manage communication between the components of the industrial automation system 10. That is, the server may manage one or more policies that include provisions or instructions that detail how communication between the components of the industrial automation system 10 is performed. The plant management system may include any suitable management computing system that receives data from a number of control systems (e.g., industrial control systems 20). As such, the plant management system may track operations of one or more facilities and one or more locations. In addition, the plant management system may issue control commands to the components of the industrial automation system 10.

Figure 5:
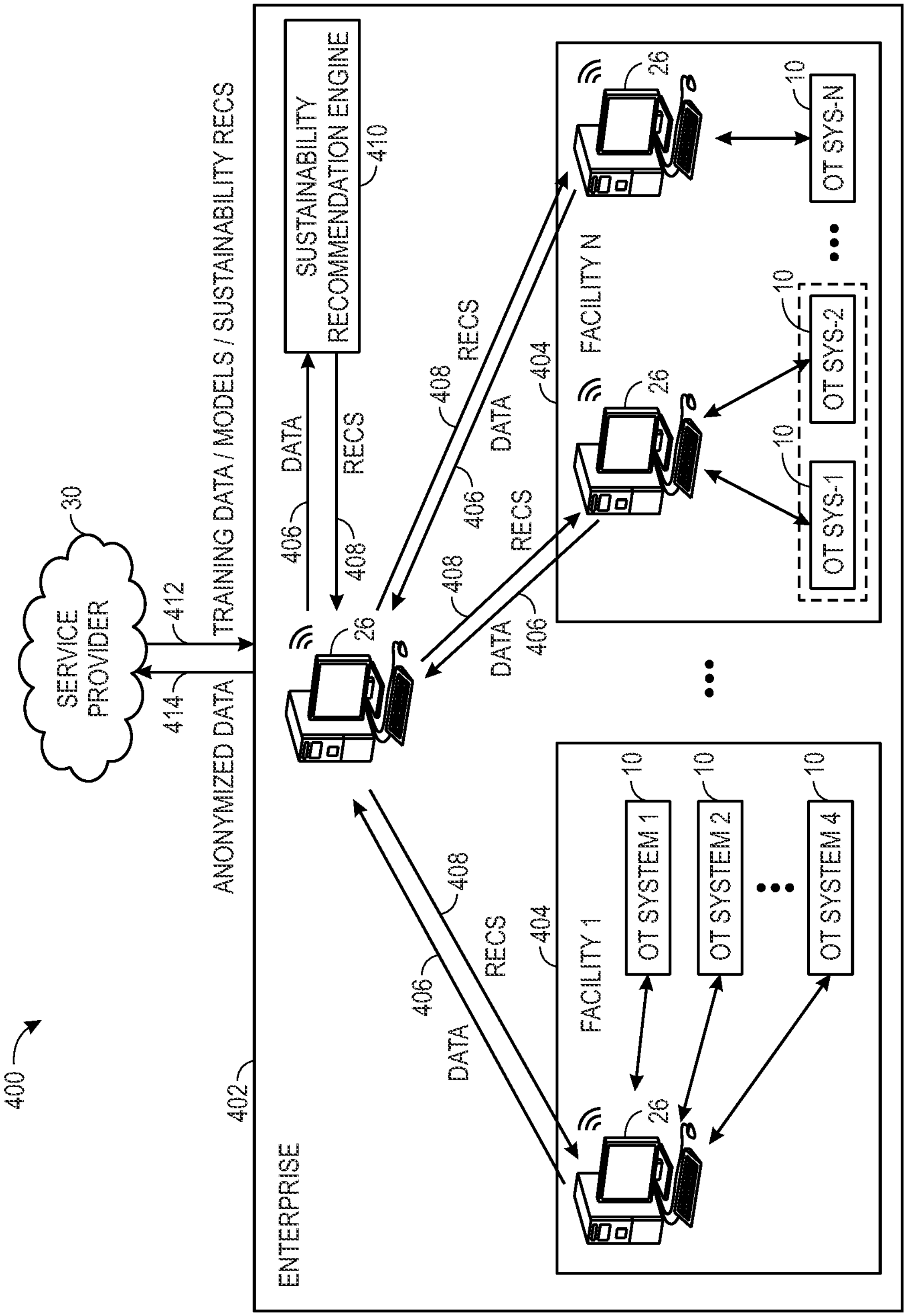
FIG. 5 illustrates a schematic of an architecture for providing sustainability recommendations as a service to an enterprise operating the industrial automation systems shown in FIGS. 1, 3, and 4, in accordance with embodiments presented herein.

As sustainability becomes a higher priority for stakeholders of enterprises and/or customers of enterprises, the data collection, analysis, and transmission systems shown in FIGS. 3 and 4 may be utilized to collect data, analyze data in-house and/or transmit data to a service provider for analysis, develop recommendations to improve sustainability metrics, and/or receive recommendations to improve sustainability metrics from a service provider and then implement the recommendations to improve sustainability metrics. For example, recommendations may be implemented to reduce energy consumption, reduce the cost of energy consumption, reduce emissions, reduce the amount of waste produced by a process, reduce water usage, reduce usage of certain chemicals and/or materials, and so forth. With this in mind, FIG. 5 illustrates a schematic of an architecture 400 for providing sustainability recommendations as a service. As shown, an enterprise 402 may operate multiple facilities 404, each having one or more industrial automation systems 10, managed by one or more computing devices 26. As shown, the industrial automation systems 10 may include one or more OT systems. For example, the industrial automation systems may include one or more drives, one or more motors, one or more controllers, one or more actuators, one or more sensors, and so forth. Further, the industrial automation systems 10 may include transport systems, such as conveyors, movers, independent carts, transport robots, autonomous vehicles (e.g., unmanned transport systems). Accordingly, the industrial automation systems 10 may be involved in manufacture, refining, packaging, bottling, assembly, transport, warehouse, storage, distribution (e.g., automated, semiautomated, or manned distribution centers), logistics, and so forth. Operations of each facility 404 may be managed by one or more computing devices 26 that may be on premises at the facility or located remote from the facility 404. Though not shown, in some embodiments, some facilities 404 may be further subdivided into areas having one or more industrial automation systems 10 under the control of a respective management system (e.g., a computing device 26 running control software). The industrial automation systems 10 may be disposed behind firewalls and/or within private networks defined by one or more firewalls. A single private network may encompass an entire facility 404, an area of a facility 404 that includes one or more industrial automation systems 10, or individual industrial automation systems 10 within a facility 404, or spanning multiple facilities 404. One or more computing devices 26 disposed throughout the enterprise 402, may run software for managing operations of the enterprise 402 and collecting data from the operations of the enterprise 402.

As previously described, the enterprise 402 may analyze collected data in house to develop sustainability recommendations for improving sustainability metrics of the enterprise 402 or transmit collected data to a service provider 30 and receive sustainability recommendations from the service provider for improving sustainability metrics of the enterprise 402.

For example, a user may utilize a sustainability tool to analyze and/or determine whether to implement sustainability recommendations for the entire enterprise 402. That is, the sustainability tool may be utilized to generate recommendations, analyze recommendations, implement, decline, or modify recommendations, roll back implemented recommendations, deploy specific recommendations to specific facilities 404, areas, industrial automation systems 10, and/or devices operated by the enterprise 402. In some embodiments, recommendations may only be accepted or declined downstream of where the sustainability tool is instantiated. For example, a user accessing the sustainability tool may be able to manage sustainability recommendations for the entire enterprise 402, whereas a user accessing the sustainability tool at Facility 1 may be able to manage sustainability recommendations within Facility 1, but may not be authorized to manage sustainability recommendations for Facility N. Similarly, a user accessing the sustainability tool via Facility N may only be able to manage sustainability recommendations for the industrial automation systems 10 that are within the Facility 1 (e.g., OT SYS-1 and OT SYS-2, but not OT SYS-N). However, in other embodiments, authority to manage sustainability recommendations within an enterprise 402 may be determined based on other factors, such as authority granted to specific users or user profiles, components affected by changes, etc.

Computing devices 26 within the enterprise 402 that run sustainability tool may develop and/or implements sustainability recommendations within the enterprise 402. For example, if a user makes a modification to a sustainability recommendation, the modification is reflected in the other instantiations of the sustainability tool throughout the enterprise 402 such that Facility 1 may make sure that the sustainability recommendation is implemented as modified by the industrial automation systems 10 within the facility 404. However, it should be understood that computing devices 26 running the sustainability tool may not be the only devices within an enterprise 402 that are capable of implementing, declining, and/or modifying sustainability recommendations. Indeed, other devices, such as edge devices, firewalls, controllers, and even industrial automation systems 10 themselves may perform such roles.

The sustainability tool may also be used to analyze collected data to develop new sustainability recommendations and/or modifications to sustainability recommendations. Data 406 may also be collected from the industrial automation systems 10 in a facility 404 during operation. The collected data 406 may include, for example, design artifacts, help ticket data, incident data, vulnerability data, network traffic data, captured network traffic (e.g., data packets), device logs, data received from one or more service providers, notes provided by an operator, software/firmware update data, warning data, error code data, operational data, temperature data, pressure data, speed/rotation data, quality control data, process scheduling/sequence data, input/output data, productions data, emissions data, energy usage data, material usage data, waste data, and so forth.

Design artifacts and/or operational data 406 may be aggregated and used to generate sustainability recommendations 408 or modifications to previous sustainability recommendations (e.g., via a sustainability recommendation engine 410). The sustainability recommendations 408 are implemented and/or enforced (e.g., via one or more enforcement points) within the enterprise 402 and/or distributed to the facilities 404 or particular industrial automation systems 10 within the enterprise 402. Once sustainability recommendations 408, or updates to sustainability recommendations 408, have been implemented and/or enforced, new data 406 may be collected and used to retrain and/or refine the sustainability recommendations, or to evaluate revised sustainability recommendations 408.

Though the embodiment shown in FIG. 5 uses the computing device 26 at the enterprise level to aggregate data 406, interface with or run the sustainability recommendation engine 410, and implement, and/or disseminate sustainability recommendations 408, it should be understood that embodiments are envisaged in which computing devices at the facility, system, or device level perform these functions. That is, aggregating data 406, running the sustainability recommendation engine 410, and implementing sustainability recommendations 408 may be performed at various levels of an enterprise's structure (e.g., the device level, the system level, the facility level, the enterprise level, one or more intermediate levels, or distributed among multiple levels).

In some embodiments, the sustainability recommendation engine 410 may be run on an edge device in an OT network. In such embodiments, the edge device may receive design artifacts and/or run-time data 406 from one or more devices on an OT network, input the received data to a sustainability recommendation engine 410 running on the edge device, and generate a set of sustainability recommendations, which may be automatically implemented, presented to a user for approval, presented to a user for consideration, or some combination thereof, via the sustainability recommendation tool. The sustainability recommendation engine 410 may run on a processor of the edge device within an operating system, or the sustainability recommendation engine 410 may run in a container that is managed by the container orchestration system 222 of FIGS. 3 and 4 (e.g., Docker, KUBERNETES®) instead of, or in addition to, the edge device. As previously described, the container orchestration system may operate in an IT environment and may include a cluster of multiple computing devices that coordinates an automatic process of managing or scheduling work of individual containers (e.g., operating system level virtualization) for applications within the computing devices of the cluster. In other words, the container orchestration system may be used to automate various tasks at scale across multiple computing devices.

In some embodiments, the enterprise 402 may purchase or subscribe to services 412, such as machine learning models, training data for training machine learning models, and/or sustainability recommendations as a service provided to the enterprise 402 by a service provider 30. In some embodiments, the enterprise 402 may collect data 414 to transmit to the service provider 30 that provides some information about the effectiveness of the system/processes deployed within the enterprise 402. Accordingly, the service provider 30 may use data 414 collected from one or more customer enterprises 402 to improve machine learning models and/or the training data provided to the enterprises 402. Customers may choose to opt in or opt out of providing data 414 to the service provider 30. In some cases, because enterprises may be hesitant to share data, data may be anonymized, masked, pseudonymized, generalized, selectively shared (e.g., the enterprise 402 may share some parameters/data, but not other parameters/data), or otherwise scrubbed before being transmitted to the service provider 30. For example, characteristic data elements (e.g., names, addresses, IP addressed, MAC addresses, phone numbers, network names, passwords, employee names, employee numbers, employee information, set points, thresholds, flow rates, etc.) within the data 414 may be identified and removed and/or changed before being transmitted. Further, data elements related to industrial processes, settings of the industrial automation systems, set points, trade secrets, intellectual property, or other proprietary information may be identified and removed or changed before being transmitted. Further, the service provider 30 may take additional steps to secure the data received by the enterprise 402, such as using a secure communication channel, encrypting data for transmission, encrypting data for storage, anonymizing data, and so forth. In some embodiments, the service provider 30 may incentivize customers to share data by requiring some extent of data sharing to receive recommendations, publicly recognizing (e.g., with awards, published rankings, etc.) customers that perform best in the tracked sustainability metrics or show the most improvement in the tracked sustainability metrics. The service provider could also create certifications or standards available to those that participate by sharing data that customers could include in marketing materials, product packaging, etc. Further, the service provider 30 could work within existing government regulatory incentive and/or tax programs to incentivize customers to share data or help develop new regulatory incentive and/or tax programs to incentivize customers to share data.

As sustainability becomes a high priority for stakeholders and/or customers, sustainability recommendations may become more dynamic, resulting in more frequent changes to processes and/or operating parameters. For example, as shown in FIG. 5, an enterprise 402 may use a service provider 30 to provide suggestions 412 for how to improve its sustainability metrics and/or run more efficiently, and so forth. Further, software updates to equipment, firmware updates to equipment, new hardware, new processes, new materials, changes to industry standards, changes to laws/regulations, etc. may lead an enterprise to implement sustainability recommendations to better fit the changing environment. However, given the size and complexity of modern OT systems 10, sustainability recommendations may be received, processed, and implemented by different devices within a network at different times, resulting different devices within a network attempting to implement different sustainability recommendations at the same time. Accordingly, instantiations of sustainability tools running throughout an enterprise 402 or OT network may coordinate with one another to facilitate implementation of sustainability recommendations.

Figure 6:
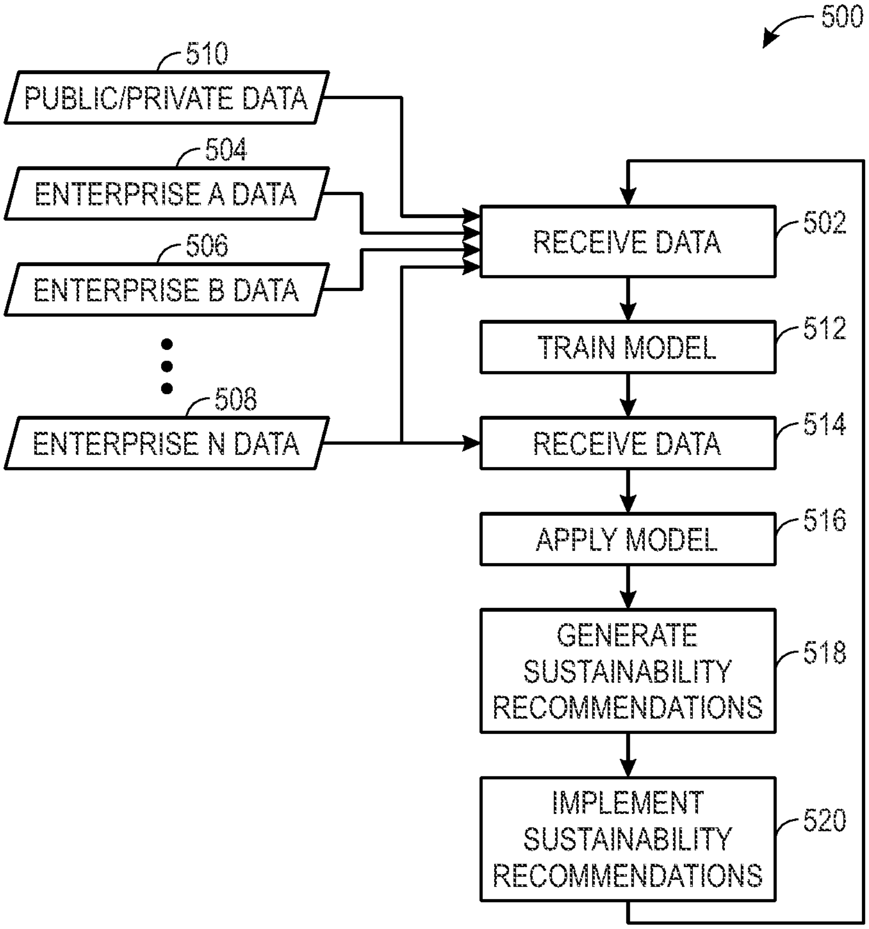
FIG. 6 is a flow chart of a process for developing and implementing sustainability recommendations in the architecture shown in FIG. 5, in accordance with embodiments presented herein.

FIG. 6 is a flow chart of a process 500 for developing and implementing sustainability recommendations. At block 502, data is received. As shown, the data may include enterprise data 504, 506, 508 from various enterprises. For example, the enterprise data 504, 506, 508 may be received from customer enterprises, such as enterprises that subscribe to or otherwise receive services provided by the service provider, such as sustainability recommendations as a service. For example, the enterprise data 504, 506, 508 may include design artifacts, help ticket data, incident data, vulnerability data, network traffic data, captured network traffic (e.g., data packets), device logs, data received from one or more service providers, notes provided by an operator, software/firmware update data, warning data, error code data, operational data, temperature data, pressure data, speed/rotation data, quality control data, process scheduling/sequence data, input/output data, production data, energy usage data, emissions data, raw material usage data, waste generation data, and so forth. Further, in some embodiments, the received data may include public and/or private data 510. This data may include private data to which the service provider may subscribe or otherwise pay for, such as industry analysis and/or trends, databases, etc. Further, the public/private data 510 may include data from journals or other publications, data published by academic, research, or other industry organizations. The public/private data 510 may also include publicly available data such as standards, industry trends, data published by non-profits and/or public or non-governmental organizations, and so forth.

At block 512, the received data may or may not be combined with other data and used as training data to train a machine learning or artificial intelligence (AI) based model. For example, received data may be used to generate training data sets. In some embodiments, a single model may be generated to be used across industries, regions, products being produced, task being performed etc. In other embodiments, different models may be generated for different industries, different regions, different products being produced, different tasks being performed, or some combination thereof. In some embodiments, some data may be set aside as validation data and then used to validate the generated model(s) and/or provide feedback for the generated models. In some embodiments, as shown and described with regard to FIG. 5, the model may be provided directly to customers for local use. In other embodiments, the model may be maintained by the service provider (e.g., on a remote server or in the cloud) and used to analyze data provided by enterprise customers. For example, at block 514 additional data may be received from a particular enterprise to be analyzed. The data received at block 514 may be the same or different from the data received at block 502. For example, the received data may be the same parameters as the data received at block 502, but for a different time period. In other embodiments, the data received at block 514 may be of different parameters, or combinations of parameters, from those received at block 502. As previously described, in some embodiments, enterprise customers may selectively share data or share data that has been processed, anonymized, encrypted, scrubbed, partially obscured, and so forth.

At block 516, the model is applied to the data received at block 514. In some embodiments, applying the model may involve generating a model or otherwise modeling/simulating one or more processes performed by the enterprise customer based on the data received at block 514, and in some cases previously received data from the enterprise customer. In some embodiments, applying the model to received data may include performing root cause analysis by determining nominal values for one or more parameters, identifying deviation from the one or more nominal values, identifying the cause of the deviation, identifying one or more solutions to the deviation, and recommending or implementing at least one of the one or more identified solutions.

At block 518 the model may be used to generate sustainability recommendations for the enterprise customer. For example, the model may consider data provided by the enterprise customer, simulate and analyze changes to the data (e.g., parameter adjustments (speed, temperature, time, torque, voltage, current, power, acceleration), threshold changes, adjustments to production schedules (e.g., take advantage of energy being cheaper at night, less efficient to run in the middle of the day when ambient temperature is highest, more efficient to run in the middle of the day when raw materials are warmer and don't need to heat up as much, etc.), updated firmware/software, movement paths, raw materials used, order of operations, scheduling of routine and/or critical maintenance, and so forth. In some cases, the change may be randomly generated, or generated based on a table or design of experiments to simulate all of a threshold amount of possible scenarios. In other embodiments, the change may be determined by the AI model based on successful changes made by other enterprise customers, other entities in the same or similar industry, region, and so forth. The model may then determine if the change would result in an improvement in one or more sustainability metrics. In some embodiments, the enterprise customer and/or the service provider may have provided the model with some indication of weights, priorities, or some other indication that one or more of the sustainability metrics may be more important than other sustainability metrics. If the change results in an improvement in the one or more sustainability metrics, the change may be kept in consideration as a recommendation to make to the enterprise customer. If multiple changes have been kept for consideration as a recommendation to make to the enterprise customer, the model may evaluate the changes to determine which of the one or more changes is best (e.g., which of the changes results in the best improvement to the tracked sustainability metrics, which change results in the best improvement to reliability, etc.) and identify the change as a sustainability recommendation.

As previously described, the tracked sustainability metrics may include, among other things, energy consumption (e.g., total, per period of time, per part, per quantity of parts produced, per shift, per day, per hour, per quarter, per year, etc.), emissions (e.g., total, per period of time, per part, per quantity of parts produced, per shift, per day, per hour, per quarter, per year, etc.), water consumption (e.g., total, per period of time, per part, per quantity of parts produced, per shift, per day, per hour, per quarter, per year, etc.), raw material consumption (e.g., total, per period of time, per part, per quantity of parts produced, per shift, per day, per hour, per quarter, per year, etc.), chemical usage (e.g., total, per period of time, per part, per quantity of parts produced, per shift, per day, per hour, per quarter, per year, etc. in both quality and quantity), water produced (e.g., total, per period of time, per part, per quantity of parts produced, per shift, per day, per hour, per quarter, per year, etc.), waste or otherwise, carbon footprint (e.g., total, per period of time, per part, per quantity of parts produced, per shift, per day, per hour, per quarter, per year, etc.), and so forth.

In some embodiments, one or more sustainability recommendations may be presented to a user for consideration. In some cases, the model may quantify a predicted improvement in one or more tracked metrics and present the quantified improvement to a user as possible if the sustainability recommendation is implemented. If accepted, the process 500 may implement the sustainability recommendation (block 520). In some embodiments, recommendations may be automatically implemented if the change to one or more parameters are sufficiently small (e.g., lass than some threshold value change) or keep one or more parameters within some set acceptable range of values in which a change can be made without explicit authorization. In other embodiments, some recommendations may be implemented by a human, such as rearranging production schedules, using different input materials, replacing one or more components, rearranging the layout of equipment in a facility, etc.)

In some embodiments, generated models may also be used to indicate to enterprise customers how they compare to competitors, other enterprises in an industry, other enterprises in the region, other enterprises in a supply chain, and so forth. Accordingly, as tracked sustainability metrics improve, enterprise customers can see how their achieved improvements compare to others.

Figure 7:
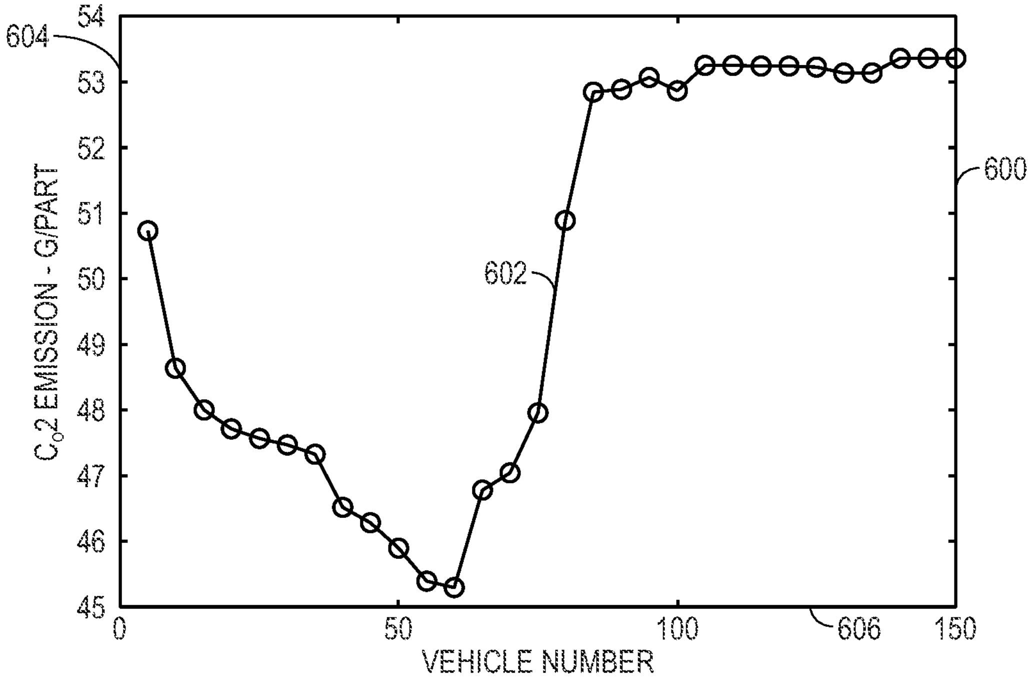
FIG. 7 is a graph of a line indicative of carbon emissions, in grams per part produced, per number of movers in a mover system for the industrial automation systems shown in FIGS. 1, 3, and 4, in accordance with embodiments presented herein.
Figure 8:
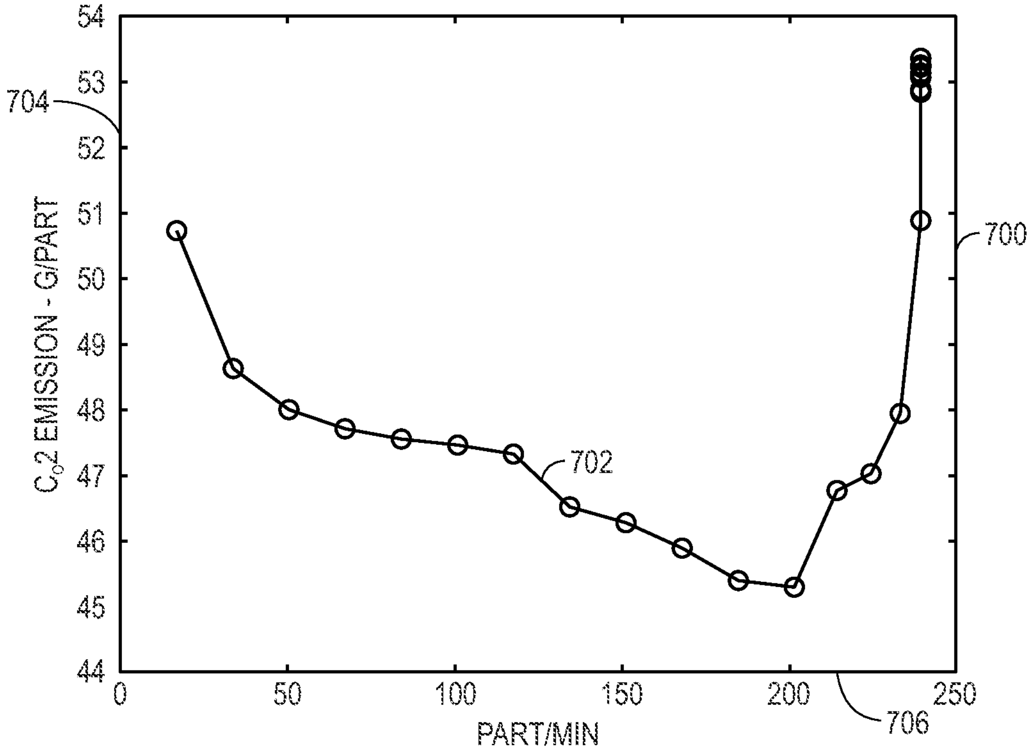
FIG. 8 is a graph of a line indicative of carbon emissions, in grams per part produced, versus number of parts produced by the industrial automation systems shown in FIGS. 1, 3, and 4, per minute, in accordance with embodiments presented herein.
Figure 9:
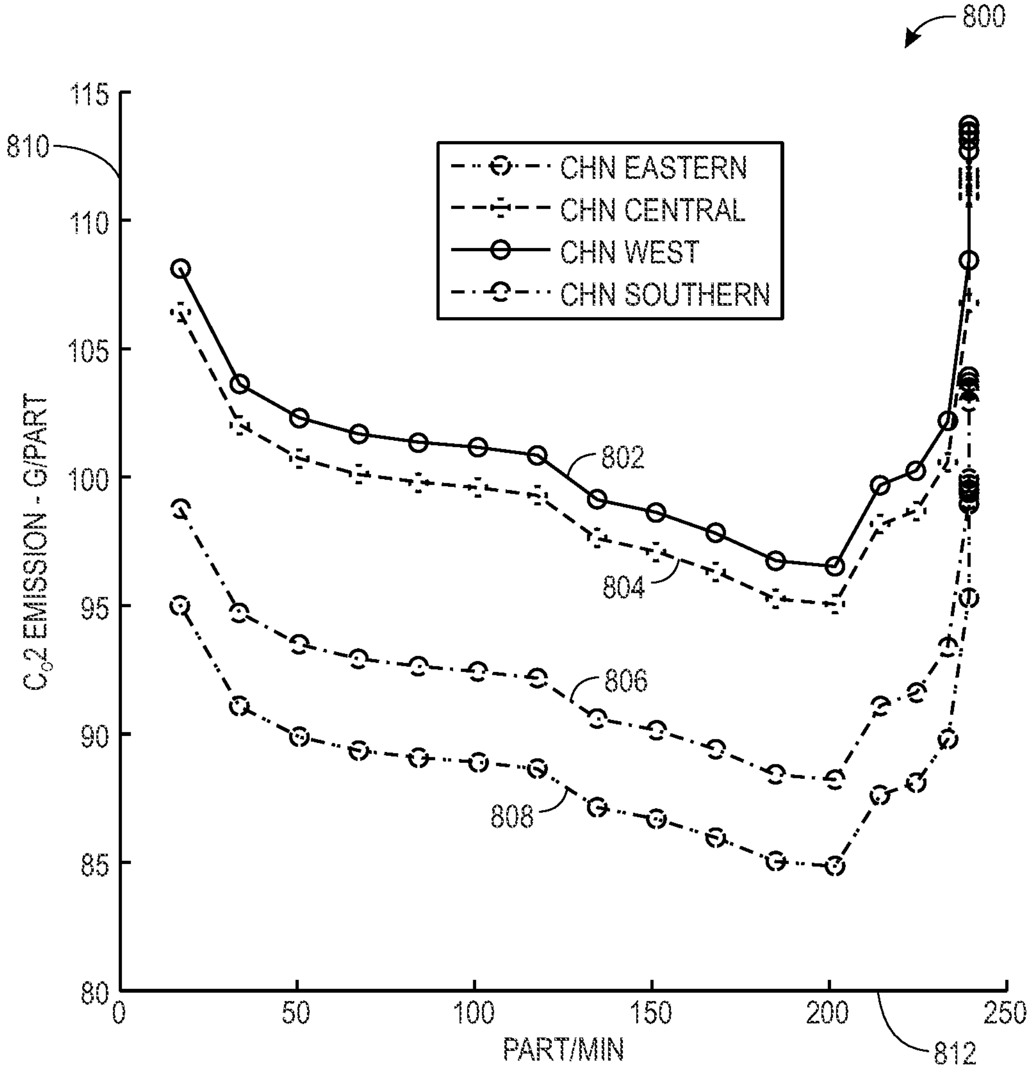
FIG. 9 is a graph of carbon emissions, in grams per part produced, versus the number of parts produced by the industrial automation systems shown in FIGS. 1, 3, and 4, per minute, in accordance with embodiments presented herein.

As previously described above, the sustainability recommendations tool, in addition to suggesting recommendations to improve an enterprise's sustainability metrics, may display visualizations, such as graphs, plots, charts, etc. representative of past/current performance, performance across industries, regions, supply chains, etc., performance to be gained by implementing sustainability recommendations. Accordingly, FIGS. 7-10 are examples of visualizations that may be displayed to a user by the sustainability recommendations tool. In particular, FIG. 7 is a graph 600 of a line 602 indicative of carbon emissions (in grams per part produced, as indicated by axis 604) per number of movers (e.g., independent carts) in a mover system (as indicated by axis 606). Such a graph 600 may be displayed to a user, for example, to help a user select a number of vehicles in a system in order to achieve the lowest emissions per part produced. For example, recommendations may be made to increase the number of vehicles, decrease the number of vehicles, and/or set a number of vehicles to improve one or more tracked sustainability metrics. FIG. 8 is a graph 700 of a line 702 indicative of carbon emissions (in grams per part produced as indicated by axis 704) versus number of parts produced by a system per minute (as indicated by axis 706). Such a graph 600 may be displayed to a user, for example, to help a user select a target number of parts to produce per minute to achieve the lowest emissions per part produced. For example, recommendations may be made to increase the number of parts produced per period of time, decrease the number of parts produced per period of time, and/or set a number of parts produced per period of time. FIG. 9 is a graph 800 of a first line 802, a second line 804, a third line 806, and a fourth line 808 indicative of carbon emissions (in grams per part produced as indicated by 810) versus the number of parts produced by a system per minute (as indicated by axis 812). Each line of the graph 800 may be associated with a different region within the geographical region. For example, the first line 802 may be associated with the western region of China, the second line 804 may be associated with the central region of China, the third line 806 may be associated with the southern region of China, and the fourth line 808 may be associated with the eastern region of China.

It should be noted that the emissions data (in the graphs 600, 700, 800) may be specific to a mover system or generally the entire production of a unit, including portions of the production of the unit performed without using the mover system. In other words, in one embodiment, the graphs 600, 700, 800 may be indicative of emissions produced by the mover system (e.g., a portion (specific to the mover system) of a total amount of emissions produced to produce one unit) or the total emissions produced to produce the unit (e.g., an amount of electrical power consumed by the mover system and other components (e.g., of the industrial automation system 10) outside of the mover system). Moreover, in other embodiments, other graphs may be generated and displayed to a user via the sustainability recommendation tool in addition to, or in the alternative to, one or more of the graphs 600, 700, 800. Such graphs may relate to other sustainability factors. For example, other graphs generated may plot water consumption, waste data, or energy consumption in total or per unit produced against the number of movers utilized or the number of units produced per minute.

FIG. 10 illustrates a chart 900 with various geographical regions (as indicated by 902) and associated emissions data (e.g., CO2 factor) (as indicated by 904). As shown in FIG. 10, the emissions may vary depending on the geographical region the manufacturing is taking place. As an example, manufacturing in the United States (U.S.) may produce less emissions than manufacturing in South Australia. Moreover, the emissions data may vary by a northern region, a southern region, a western region, and an eastern region within the geographical region. As another example, manufacturing within the east China grid may produce less emissions than manufacturing within the central China grid.

The present disclosure is directed to techniques for developing recommendations for improving performance in one or more tracked sustainability metrics in operating one or more industrial automation systems. Specifically, a service provider may receive operational data from one or more enterprises operating one or more industrial automation systems to perform one or more industrial automation processes. The service provider may generate a training data set based on the received data and train a model to model or simulate the industrial automation processes. The model may be configured to receive operational data captured from an industrial automation system performing an industrial automation process, model the industrial automation process, model one or more adjustments to the industrial automation process, identify adjustments that improve one or more sustainability metrics. In some embodiments, trained models may be provided to enterprise customers to run locally. In other embodiments, the models may be run by the service provider. In such embodiments, enterprise customers may provide data to the service provider, which applies a model to the data and returns sustainability recommendations. In some cases, the sustainability recommendations may quantify the expected improvement in the one or more sustainability metrics by implementing the sustainability recommendation. The sustainability metrics may include, for example, energy consumption, emissions, water consumption, raw material consumption, chemical usage, waste produced, carbon footprint, and so forth. Sustainability recommendations may include adjusting one or more operational parameters, adjusting one or more threshold values, adjusting a production schedule, scheduling of maintenance, scheduling a service, and so forth. For example, one or more visualizations may be provided to an operator. Some sustainability recommendations may be automatically implemented, while others may be implemented after authorization. Still other sustainability recommendations (e.g., rearranging equipment, replacing equipment, using different raw materials, performing a new process, etc. may be implemented manually by a human. As time progresses, the service provider may further train models using data received from enterprise customers or other available data.

Technical effects of implementing the disclosed techniques include improved performance in one or more tracked sustainability metrics (e.g., energy consumption, emissions, water consumption, raw material consumption, chemical usage, waste produced, carbon footprint, etc.), resulting in less energy consumption, less money spent on utilities, fewer emissions, less water consumption, les raw materials consumed, more sustainable materials used, less waste produced, more sustainable waste produced, lower carbon footprint, etc. Further, rather than expending time and resources developing strategies for improving one or more sustainability metrics, by relying on a service provider to provide recommendations, an enterprise may take advantage of the particular sustainability expertise of the service provider. Because the service provider has visibility in data and the practices of multiple enterprises, which may span multiple industries, regions, etc., the service provider may be able to provide recommendations to the enterprise that may have been proven successful at other enterprises, which is likely to result in better sustainability recommendations than the enterprise would be able to develop on its own. Moreover, by having access to data from many enterprises across multiple industries, the service provider may have access to larger training data sets and longer histories of historical data, resulting in better models, and thus more effective sustainability recommendations. Accordingly, the enterprise may be able to take advantage of proven sustainability improving practices and/or strategies used by other enterprises.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112 (f). However, for any claims containing elements designated in any other manner, it is intended that such elements are not to be interpreted under 35 U.S.C. 112 (f).

The invention claimed is:

1. A system, comprising:

processing circuitry; and a memory, accessible by the processing circuitry, the memory storing instructions that, when executed by the processing circuitry, cause the processing circuitry to perform operations comprising:

receiving operational data captured from an industrial automation system performing an industrial automation process;

modeling the industrial automation process based on the operational data, wherein the modeling of the industrial automation process comprises performing a causal analysis on the operational data, wherein the causal analysis comprises:

determining nominal values for one or more parameters;

identifying deviation from the nominal values; and identifying a cause of the deviation;

modeling one or more adjustments to the industrial automation process to resolve the identified cause of the deviation, wherein the one or more adjustments comprise an adjustment to a production schedule of the industrial automation process based on ambient environmental conditions or time-based utility rates;

identifying that the modeling of the one or more adjustments to the industrial automation process indicates that the one or more adjustments to the industrial automation process improve one or more sustainability metrics for the industrial automation process, wherein the one or more sustainability metrics comprise a carbon footprint calculated based on a geographical region in which the industrial automation system is located, an amount of water consumption, or an amount of physical waste produced;

evaluating the one or more adjustments to determine which of the one or more adjustments results in a greatest improvement to the one or more sustainability metrics;

generating one or more sustainability recommendations to implement the one or more adjustments to the industrial automation process, wherein generating the one or more sustainability recommendations comprises quantifying a predicted improvement in the one or more sustainability metrics; and implementing the one or more adjustments to the industrial automation process.

2. The system of claim 1, wherein the operations comprise:

receiving training data captured from a plurality of industrial automation systems performing a plurality of industrial automation processes;

building a training dataset based on the training data; and training a model using the training dataset, wherein the model is configured to model the plurality of industrial automation processes.

3. The system of claim 2, wherein the operations comprise:

receiving additional training data captured from the plurality of industrial automation systems performing the plurality of industrial automation processes;

building a supplemental training dataset based on the additional training data; and retraining the model using the supplemental training dataset.

4. The system of claim 1, wherein the operations comprise:

receiving a trained model from a service provider;

wherein modelling the industrial automation process based on the operational data comprises applying the trained model to the operational data.

5. The system of claim 1, wherein the operations comprise:

displaying, via a graphical user interface, the one or more sustainability recommendations; and receiving an input authorizing the one or more sustainability recommendations.

6. The system of claim 1, wherein the sustainability metrics comprise energy consumption, emissions, raw material consumption, chemical usage, or any combination thereof.

7. The system of claim 1, wherein the one or more sustainability recommendations comprise adjusting one or more operational parameters, adjusting one or more threshold values, scheduling of maintenance, scheduling a service, or any combination thereof.

8. A method, comprising:

receiving first operational data representative of a plurality of respective industrial automation processes performed by a plurality of industrial automation systems;

training a model to simulate the plurality of respective industrial automation processes based on the first operational data;

receiving second operational data captured from a particular industrial automation system performing a particular industrial automation process at a particular facility;

applying the trained model to simulate the particular industrial automation process based on the second operational data, wherein applying the trained model comprises performing a causal analysis on the second operational data, wherein the causal analysis comprises:

determining nominal values for one or more parameters;

identifying deviation from the nominal values; and identifying a cause of the deviation;

identifying that simulating one or more adjustments to the particular industrial automation process indicates that the one or more adjustments to the particular industrial automation process improve one or more sustainability metrics for the particular industrial automation process, wherein the simulated one or more adjustments comprise an adjustment to a production schedule of the industrial automation process based on ambient environmental conditions or time-based utility rates, wherein the one or more sustainability metrics comprise a carbon footprint calculated based on a geographical region in which the industrial automation system is located, an amount of water consumption, or an amount of physical waste produced;

evaluating the one or more adjustments to determine which of the one or more adjustments results in a greatest improvement to the one or more sustainability metrics;

generating one or more sustainability recommendations to implement the one or more adjustments to the particular industrial automation process, wherein generating the one or more sustainability recommendations comprises quantifying a predicted improvement in the one or more sustainability metrics; and transmitting the one or more sustainability recommendations to the particular facility.

9. The method of claim 8, wherein the one or more adjustments are generated by the trained model.

10. The method of claim 8, wherein the one or more adjustments are generated based on the first operational data representative of the plurality of respective industrial automation processes performed by the plurality of industrial automation systems.

11. The method of claim 8, comprising:

receiving third operational data representative of the plurality of respective industrial automation processes performed by the plurality of industrial automation systems; and retraining the trained model to simulate the plurality of respective industrial automation process based on the first operational data and the third operational data.

12. The method of claim 8, comprising: generating one or more visualizations illustrating how the one or more adjustments to the particular industrial automation process improve the one or more sustainability metrics for the particular industrial automation process, wherein the one or more visualizations display the quantified predicted improvement in the one or more sustainability metrics.

13. The method of claim 8, wherein the sustainability metrics comprise energy consumption, emissions, raw material consumption, chemical usage, or any combination thereof.

14. The method of claim 8, wherein the one or more sustainability recommendations comprise adjusting one or more operational parameters, adjusting one or more threshold values, scheduling of maintenance, scheduling a service, or any combination thereof.

15. A non-transitory computer readable medium storing instructions that, when executed by processing circuitry, cause the processing circuitry to perform operations comprising:

collecting operational data from an industrial automation system performing an industrial automation process;

transmitting the operational data to a service provider;

receiving, from the service provider, one or more sustainability recommendations to implement one or more adjustments to the industrial automation process, wherein the one or more adjustments comprise an adjustment to a production schedule of the industrial automation process based on ambient environmental conditions or time-based utility rates, wherein modeling of the one or more adjustments to the industrial automation process indicates that the one or more adjustments to the industrial automation process improve one or more sustainability metrics for the industrial automation process, wherein the modeling comprises performing a causal analysis on the operational data, wherein the causal analysis comprises determining nominal values for one or more parameters, identifying deviation from the nominal values, and identifying a cause of the deviation, and wherein the one or more adjustments are modeled to resolve the identified cause of the deviation, wherein the one or more sustainability metrics comprise a carbon footprint calculated based on a geographical region in which the industrial automation system is located, an amount of water consumption, or an amount of physical waste produced, wherein the one or more sustainability recommendations are based on an evaluation of the one or more adjustments to determine which of the one or more adjustments results in a greatest improvement to the one or more sustainability metrics, and wherein the one or more sustainability recommendations quantify a predicted improvement in the one or more sustainability metrics; and implementing the one or more adjustments to the industrial automation process.

16. The non-transitory computer readable medium of claim 15, wherein the operations comprise processing the collected operational data to filter the operational data, remove one or more data points from the operational data, or both, before transmitting the operational data to the service provider.

17. The non-transitory computer readable medium of claim 15, wherein the operations comprise:

displaying, via a graphical user interface, the one or more sustainability recommendations, wherein the graphical user interface displays the quantified predicted improvement in the one or more sustainability metrics; and receiving an input authorizing the one or more sustainability recommendations.

18. The non-transitory computer readable medium of claim 15, wherein the operations comprise:

collecting additional operational data from the industrial automation system performing the industrial automation process;

transmitting the additional operational data to the service provider; and receiving, from the service provider, one or more additional sustainability recommendations to implement one or more additional adjustments to the industrial automation process, wherein modeling of the one or more additional adjustments to the industrial automation process indicates that the one or more additional adjustments to the industrial automation process improve the one or more sustainability metrics for the industrial automation process.

19. The non-transitory computer readable medium of claim 15, wherein the operational data is transmitted to the service provider by an edge device.

20. The non-transitory computer readable medium of claim 15, wherein the sustainability metrics comprise energy consumption, emissions, raw material consumption, chemical usage, or any combination thereof.

* * * * *